US012623724B2

(12) United States Patent
Park et al.

(10) Patent No.: US 12,623,724 B2
(45) Date of Patent: May 12, 2026

(54) SIDE REINFORCED VEHICLE BODY

(71) Applicants: Hyundai Motor Company, Seoul (KR); Kia Corporation, Seoul (KR)

(72) Inventors: Taeou Park, Seoul (KR); Sunghoon Cho, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 395 days.

(21) Appl. No.: 18/214,288

(22) Filed: Jun. 26, 2023

(65) Prior Publication Data

US 2024/0092426 A1     Mar. 21, 2024

(30) Foreign Application Priority Data

Sep. 15, 2022    (KR) ......................... 10-2022-0116575

(51) Int. Cl.
| | |
|---|---|
| *B62D 21/15* | (2006.01) |
| *B62D 25/02* | (2006.01) |
| *B62D 27/06* | (2006.01) |
| *B62D 29/00* | (2006.01) |
| *B62D 29/04* | (2006.01) |

(52) U.S. Cl.
CPC ......... *B62D 21/157* (2013.01); *B62D 25/025* (2013.01); *B62D 27/065* (2013.01); *B62D 29/005* (2013.01); *B62D 29/043* (2013.01)

(58) Field of Classification Search
CPC ............... B62D 21/157; B62D 25/025; B62D 25/2036; B62D 29/04; B62D 29/041; B62D 29/043
See application file for complete search history.

(56) References Cited

U.S. PATENT DOCUMENTS

| | | | |
|---|---|---|---|
| 2015/0137558 A1* | 5/2015 | Ayuzawa ............. | B62D 25/025 |
| | | | 296/193.07 |
| 2017/0080980 A1* | 3/2017 | Alwan ...................... | B60K 1/04 |
| 2019/0047628 A1* | 2/2019 | Kawase ............. | B62D 25/2036 |
| 2019/0193790 A1* | 6/2019 | Choi ..................... | B62D 21/157 |
| 2019/0256150 A1* | 8/2019 | Cooper ............... | B62D 21/155 |
| 2019/0264769 A1* | 8/2019 | Gergely ................. | B60R 19/03 |
| 2022/0041219 A1* | 2/2022 | Son ...................... | B62D 21/157 |
| 2022/0063731 A1* | 3/2022 | Tsubaki ............... | B62D 25/025 |
| 2022/0111904 A1* | 4/2022 | Hwang ............... | B62D 21/157 |
| 2023/0023627 A1* | 1/2023 | Ito ......................... | B62D 25/025 |
| 2023/0219626 A1* | 7/2023 | Kuipers ............... | B62D 25/025 |
| | | | 296/187.12 |
| 2023/0303179 A1* | 9/2023 | Kuipers ............... | B62D 25/025 |
| 2023/0347986 A1* | 11/2023 | Kuipers ............... | B62D 25/025 |
| 2024/0083513 A1* | 3/2024 | Kuipers ............... | B62D 21/157 |
| 2024/0092426 A1* | 3/2024 | Park ...................... | B62D 27/065 |
| 2024/0158013 A1* | 5/2024 | Zhao ...................... | B62D 29/04 |
| 2024/0239411 A1* | 7/2024 | Carl .................... | B62D 25/2036 |
| 2024/0286685 A1* | 8/2024 | Lee ....................... | B62D 25/025 |
| 2024/0383533 A1* | 11/2024 | Shin .................... | B62D 25/2036 |
| 2025/0075766 A1* | 3/2025 | Besnard ............... | B62D 21/157 |
| 2025/0091646 A1* | 3/2025 | Nisbet .................... | C22C 21/00 |

(Continued)

*Primary Examiner* — Gregory A Blankenship
(74) *Attorney, Agent, or Firm* — MORGAN, LEWIS & BOCKIUS LLP

(57) ABSTRACT

A side reinforced vehicle body includes a side sill inner formed in a longitudinal direction of a cabin portion, a side sill outer surrounding the side sill inner, and a side reinforcement including a zig-zag pattern cross-section and disposed between the side sill inner and the side sill outer.

15 Claims, 8 Drawing Sheets

(56) References Cited

U.S. PATENT DOCUMENTS

| | | | |
|---|---|---|---|
| 2025/0187667 A1* | 6/2025 | Lee | B62D 21/15 |
| 2025/0206378 A1* | 6/2025 | Shirai | B60K 1/04 |
| 2025/0282425 A1* | 9/2025 | Kuipers | B62D 29/008 |

* cited by examiner

SIDE REINFORCED VEHICLE BODY

CROSS-REFERENCE TO RELATED APPLICATION

The present application claims priority to Korean Patent Application No. 10-2022-0116575 filed on Sep. 15, 2022, the entire contents of which is incorporated herein for all purposes by this reference.

BACKGROUND OF THE PRESENT DISCLOSURE

Field of the Present Disclosure

The present disclosure relates to a side reinforced vehicle body. More particularly, the present disclosure relates to a vehicle body reinforced on a side using a side reinforcement having a zig-zag pattern.

Description of Related Art

It has been used as methods to prepare for side collision of a cabin portion of the vehicle in which the occupant is boarding, for example, a method of increasing the cross-section size of the side sill, a method of preventing external objects from entering the cabin by additionally inserting aluminum and CFRP structures into the steel vehicle body and the like have been used.

That is, in a general vehicle body, a closed cross-section structure has been applied to the side sill to prepare for a side collision.

A closed cross-section consisting of a side sill inner panel and a side external reinforce panel is applied to a typical steel vehicle body, and a bulk head may be inserted into the closed cross-section.

Recently, environmental pollution by exhaust gas has become a problem, and regulations on internal combustion engine-based vehicles are being strengthened, and research and development on hybrid vehicles, battery electric vehicles, and hydrogen electric vehicles are being conducted.

A high power battery is mounted on the present environment-friendly vehicle, and the high power battery is mainly mounted on the vehicle body floor. When a high power battery is mounted on the vehicle body floor, it is possible to prevent damage to the occupant and battery by applying a closed cross-section shape of steel material and applying an aluminum extruded member as a reinforcement member.

Carbon Fiber Reinforced Plastic (CFRP) is a composite material that utilizes carbon fiber as a reinforcing material and a thermosetting resin or thermoplastic resin as a matrix. Because CFRP is relatively light and has high strength, its use in vehicle body manufacturing is increasing.

However, when combining the structure of CFRP material with the structure of aluminum or steel material, the internal structural corrosion due to heterogeneous bonding must be considered.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body reinforced on a side using a side reinforcement including a zig-zag pattern.

A side reinforced vehicle body according to various exemplary embodiments of the present disclosure may include a side sill inner formed in a longitudinal direction of a cabin portion, a side sill outer surrounding the side sill inner, and a side reinforcement including a zig-zag pattern cross-section and disposed between the side sill inner and the side sill outer.

The side reinforcement may be integrally formed with CFRP material.

The side reinforcement may include a plurality of upper reinforcement surface, a plurality of lower reinforcement surface, and a plurality of side reinforcement surfaces connecting the upper reinforcement surfaces and the lower reinforcement surfaces.

The side reinforcement may further include an internal connection surface in contact with the side sill inner.

The side reinforcement may further include an external connection surface in contact with the side sill outer.

The cabin portion may include a cabin under floor, and a cross member inner mounted to the cabin under floor along the width direction of the vehicle body.

The cabin under floor may include an under floor body, and a mount protruding portion on which the cross member inner is mounted.

The cross member inner may be formed of a foam core material

The under floor body and the lower reinforcement surface may form a lower crash load path, and the mount protruding portion and the upper reinforcement surface may form an upper crash load path.

The cabin portion may be formed of CFRP material, and the internal connection surface and the side sill inner are bonded together.

The cabin portion may be formed of a metal material, and the internal connection surface and the side sill inner may be bolted together.

The side sill outer may be formed of CFRP material, and the external connection surface and the side sill outer may be bonded together.

The side sill outer may be formed of a metal material, and the external connection surface and the side sill outer may be bolted together.

The cabin portion may include an internal tunnel portion protruding to a center portion thereof, and the cross member inner may contact with the internal tunnel portion.

According to the side reinforced vehicle body according to various exemplary embodiments of the present disclosure, the side of the vehicle body may be reinforced using side reinforcement including a zig-zag pattern.

Furthermore, effects which may be obtained or predicted by various exemplary embodiments of the present disclosure shall be directly or implicitly included in the detailed description of various exemplary embodiments of the present disclosure. That is, various effects predicted according to various exemplary embodiments of the present disclosure will be included within a detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
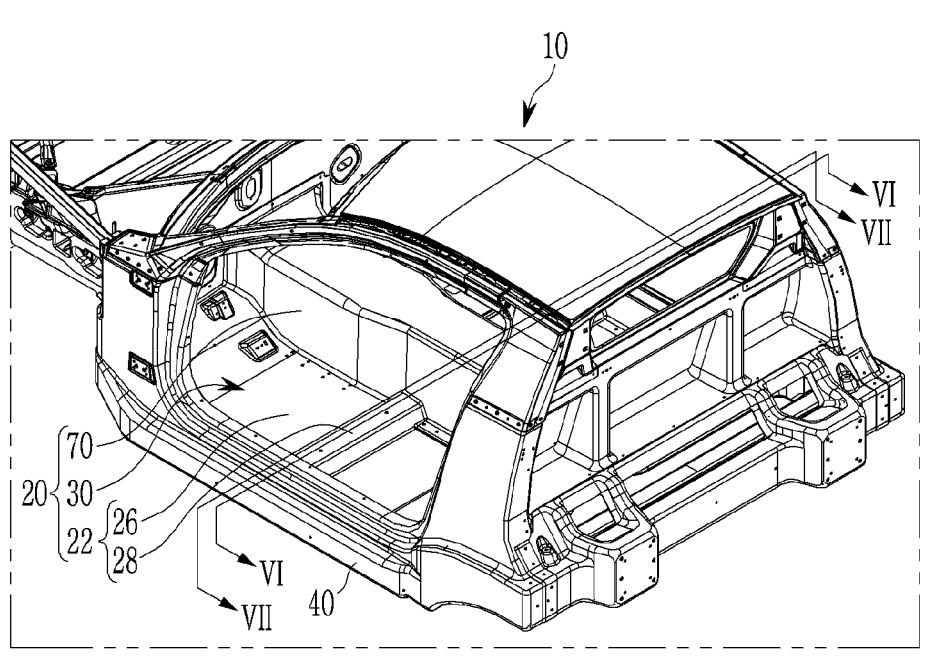
FIG. 1 is a perspective view of a side reinforced vehicle body according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described exemplary embodiments may be modified in various different ways, all without departing from the spirit or scope of the present disclosure.

To clearly describe the present disclosure, parts irrelevant to the description are omitted, and the same reference numerals are assigned to the same or similar components throughout the specification.

Because the size and thickness of each component shown in the drawings are arbitrarily shown for convenience of description, the present disclosure is not necessarily limited to those shown in the drawings, and the thickness is enlarged to clearly express various parts and regions.

Furthermore, in the detailed description below, the names of the components are classified as first, second, etc., to classify them as the components are the same, and the order is not necessarily limited in the following description.

Throughout the specification, when a part includes a certain component, this means that it may further include other components without excluding other components unless otherwise stated.

Furthermore, terms such as. unit, means described in the specification mean a comprehensive unit of configuration that performs at least one function or operation.

When a part such as a layer, film, region, plate, etc. is said to be "on" another part, this includes not only the case directly on the other part, but also the case where there is another part in therebetween.

In contrast, when an element is referred to as being "directly on" another element, there are no intervening elements present.

Various exemplary embodiments of the present disclosure will hereinafter be described in detail with reference to the accompanying drawings.

Figure 2:
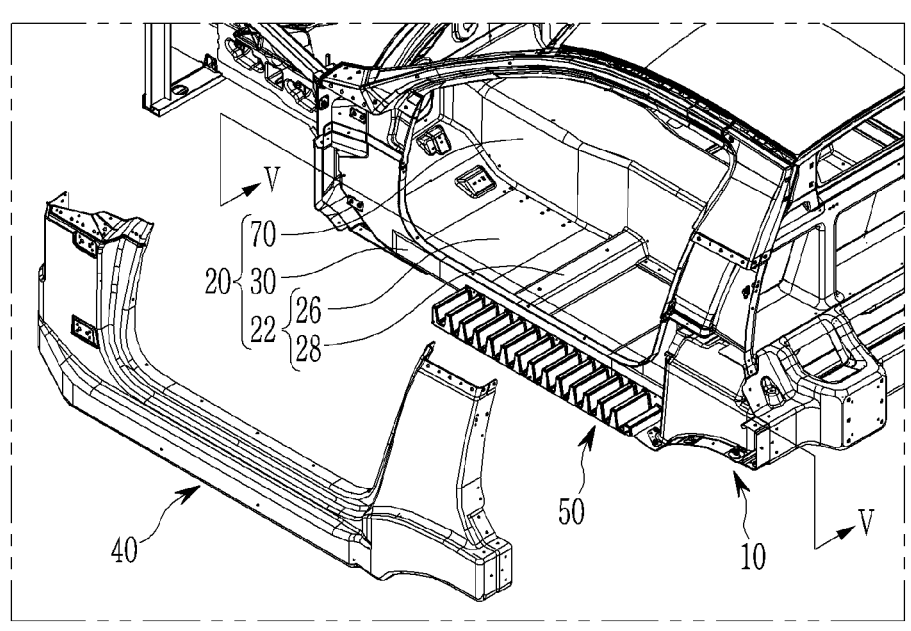
FIG. 2 is a partially exploded perspective view of a side reinforced vehicle body according to various exemplary embodiments of the present disclosure.

FIG. 1 is a perspective view of a side reinforced vehicle body according to various exemplary embodiments of the present disclosure, and FIG. 2 is a partially exploded perspective view of a side reinforced vehicle body according to various exemplary embodiments of the present disclosure.

Figure 3:
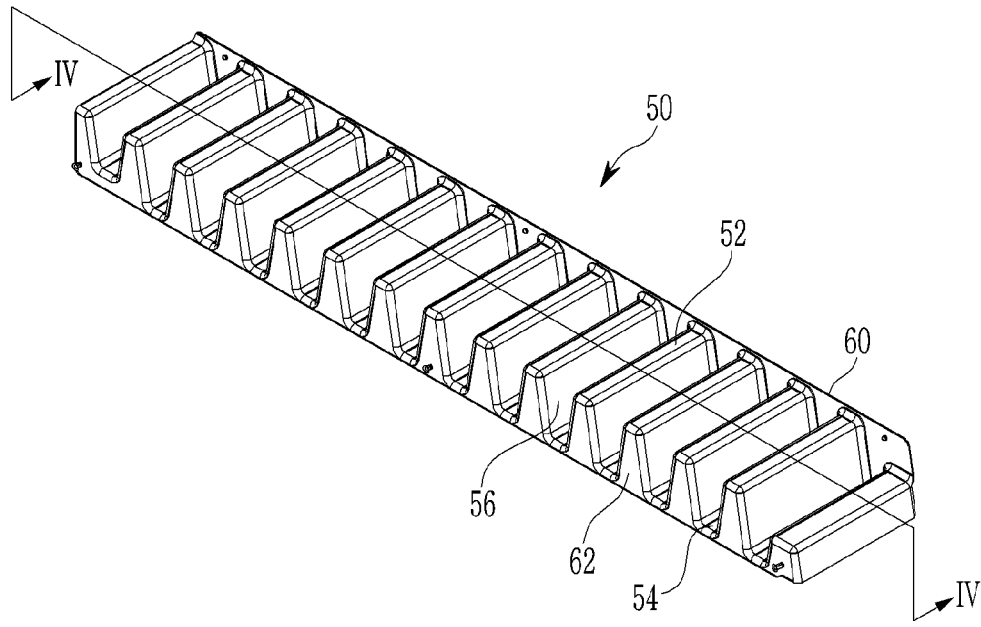
FIG. 3 is a perspective view of a side reinforcement portion which may be applied to a side reinforced vehicle body according to various exemplary embodiments of the present disclosure.
Figure 4:
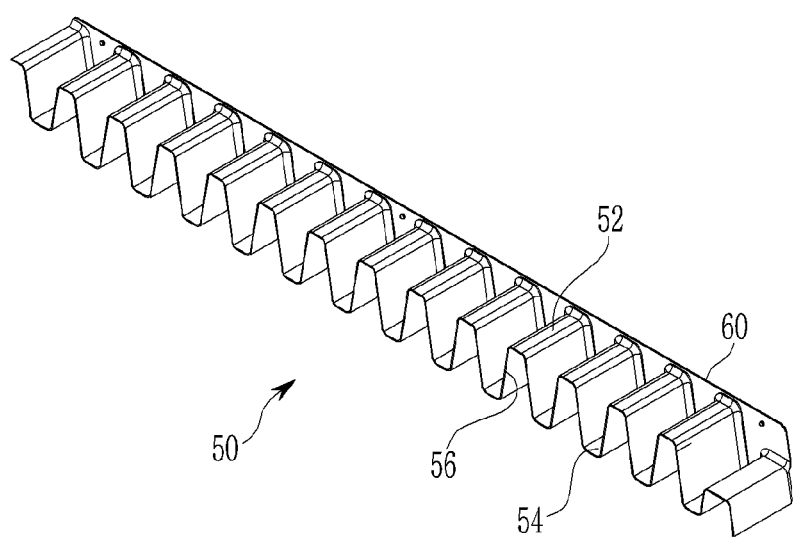
FIG. 4 is a cross-section perspective view along line VI-VI in FIG. 3.

FIG. 3 is a perspective view of a side reinforcement portion which may be applied to a side reinforced vehicle body according to various exemplary embodiments of the present disclosure, and FIG. 4 is a cross-section perspective view along line VI-VI in FIG. 3.

Referring to FIG. 1, FIG. 2, FIG. 3 and FIG. 4, a side reinforced vehicle body according to various exemplary embodiments of the present disclosure may include a side sill inner 30 formed in a longitudinal direction of a cabin portion 20, a side sill outer 40 surrounding the side sill inner 30, and a side reinforcement 50 including a zig-zag pattern cross-section and disposed between the side sill inner 30 and the side sill outer 40.

The side reinforcement 50 may be integrally formed with CFRP material, and may be mounted in a side direction of the vehicle body 10 in the longitudinal direction of the vehicle body 10.

CFRP (Carbon Fiber Reinforced Plastic) is a composite material that utilizes carbon fiber as a reinforcing material and a thermosetting resin or thermoplastic resin as a matrix, is relatively light and has high strength.

CFRP material is lighter than steel, has high strength, and is an excellent structure in terms of mold cost reduction.

The side reinforcement 50 includes a cross-section of a zig-zag pattern, and may include an effect similar to that in which a plurality of ribs are disposed with respect to a side impact load direction.

That is, the side reinforcement 50 may include a plurality of upper reinforcement surface 52, a plurality of lower reinforcement surface 54, and a side reinforcement surface 56 connecting the upper reinforcement surface 52 and the lower reinforcement surface 54.

That is, the side reinforcement 50 is formed by sequentially connecting the side reinforcement surface 56, the upper reinforcement surface 52, the side reinforcement surface 56, and the lower reinforcement surface 54. Thus, the side reinforcement 50 can form a zig-zag pattern to absorb shock in the event of a vehicle's lateral collision to protect passengers and prevent damage to the battery.

The zig-zag pattern includes a trapezoidal shape and an inverted trapezoidal shape alternately formed each other.

The side reinforcement 50 may further include an internal connection surface 60 in contact with the side sill inner 30.

The internal connection surface 60 connects the side reinforcement surface 56, the upper reinforcement surface 52, and the lower reinforcement surface 54 to increase the strength of the side reinforcement 50 and distributes the impact to the side sill inner 30 in the event of a side direction collision.

The side reinforcement 50 may further include an external connection surface 62 in contact with the side sill outer 40.

The external connection surface 62 connects the side reinforcement surface 56, the upper reinforcement surface 52, and the lower reinforcement surface 54 to increase the strength of the side reinforcement 50, and in the event of a side direction collision, the impact transmitted from the side sill outer 40 may be distributed.

That is, when the local impact of the side sill outer 40 is transmitted, the impact may be distributed to the entire parts of the side reinforcement 50, and the impact may be dispersed through the side sill inner 30.

Figure 5:
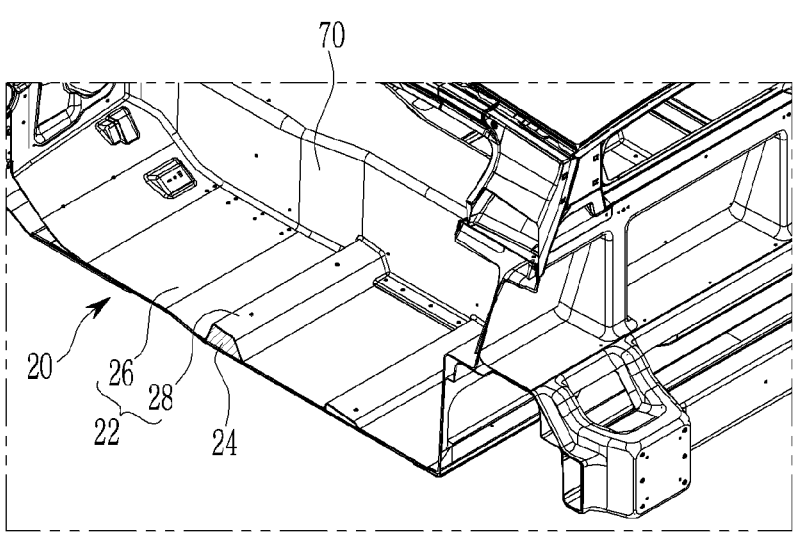
FIG. 5 is a cross-section perspective view along line V-V in FIG. 2.
Figure 6:
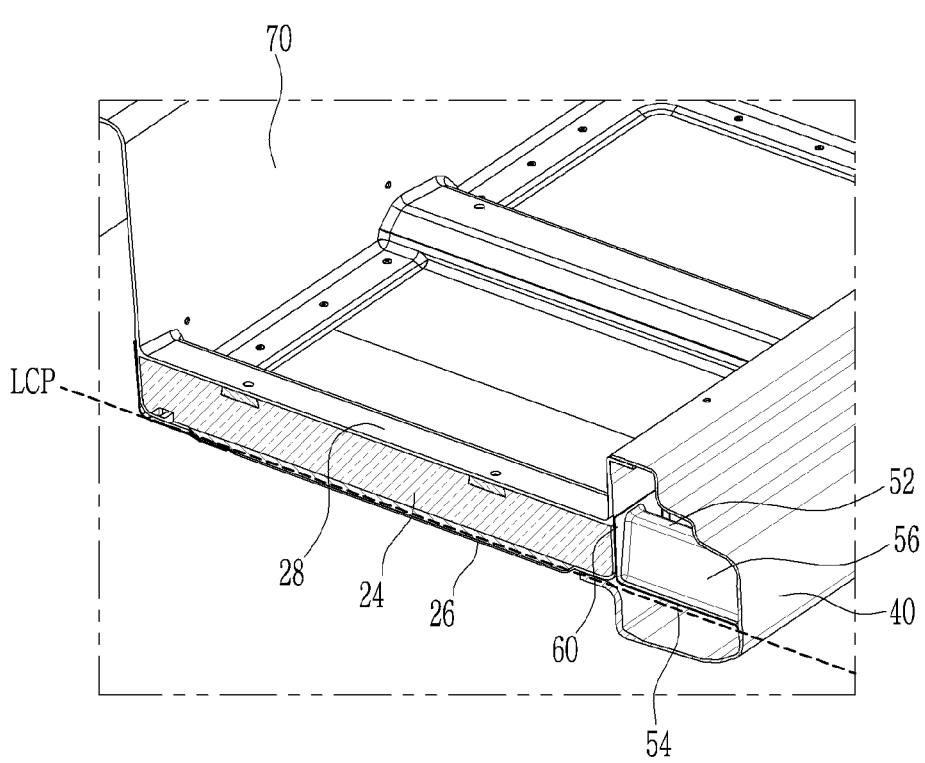
FIG. 6 is a cross-section perspective view along line VI-VI in FIG. 1.

FIG. 5 is a cross-section perspective view along line V-V in FIG. 2, and FIG. 6 is a cross-section perspective view along line VI-VI in FIG. 1.

Referring to FIG. 1, FIG. 2, FIG. 5 and FIG. 6, the cabin portion 20 may include a cabin under floor 22, and a cross member inner 24 mounted to the cabin under floor 22 along the width direction of the vehicle body.

The cabin portion 20 includes an internal tunnel portion 70 formed to protrude to the center portion thereof, and the cross member inner 24 may contact with the internal tunnel portion 70.

The internal tunnel portion 70 is protruded in the longitudinal direction of the vehicle body 10, and electric components may be mounted therein.

Furthermore, the internal tunnel portion 70 may distribute the impact load in the forward and backward direction of the vehicle body 10 when the vehicle body 10 collides with the front and rear direction thereof.

The cross member inner 24 may absorb the impact load transmitted from the side sill outer 40 and the side reinforcement 50 and distribute the impact to the internal tunnel portion 70 during a side direction collision.

The cabin under floor 22 may include an under floor body 26 and a mount protruding portion 28 on which the cross member inner 24 is mounted.

The protrude shape of the mount protruding portion 28 can absorb the impact load transmitted from the side sill outer 40 and the side reinforcement 50 by strengthening the cabin under floor 22 and distribute the impact to the internal tunnel portion 70.

The cross member inner 24 may be formed of a foam core material.

The foam core material is light and easy to process, and when an impact is transmitted from the side sill outer 40 and the side reinforcement 50 during a side-direction collision, the foam core material can partially deform to absorb the impact load and distribute a portion of the impact load to the internal tunnel portion 70.

Furthermore, the cross member inner 24 is filled inside the mount protruding portion 28 to absorb an impact upon a side-direction collision and reduce deformation of the mount protruding portion 28.

Although not shown, a high power battery may be mounted on the lower or upper portion of the cabin under floor 22.

Referring to FIG. 6, the under floor body 26 may form a lower crash load path LCP together with the lower reinforcement surface 54.

The under floor body 26 and the lower reinforcement surface 54 may be disposed at adjacent heights along the width direction of the vehicle body 10 to form the lower crash load path LCP.

That is, when a side collision of the vehicle body 10 occurs, the impact load is distributed to the internal tunnel portion 70 through the lower crash load path LCP formed by the side sill outer 40, the lower reinforcement surface 54 of the side reinforcement 50, and the under floor body 26, to reduce occupant injury and prevent damage to high power batteries during collision.

Figure 7:
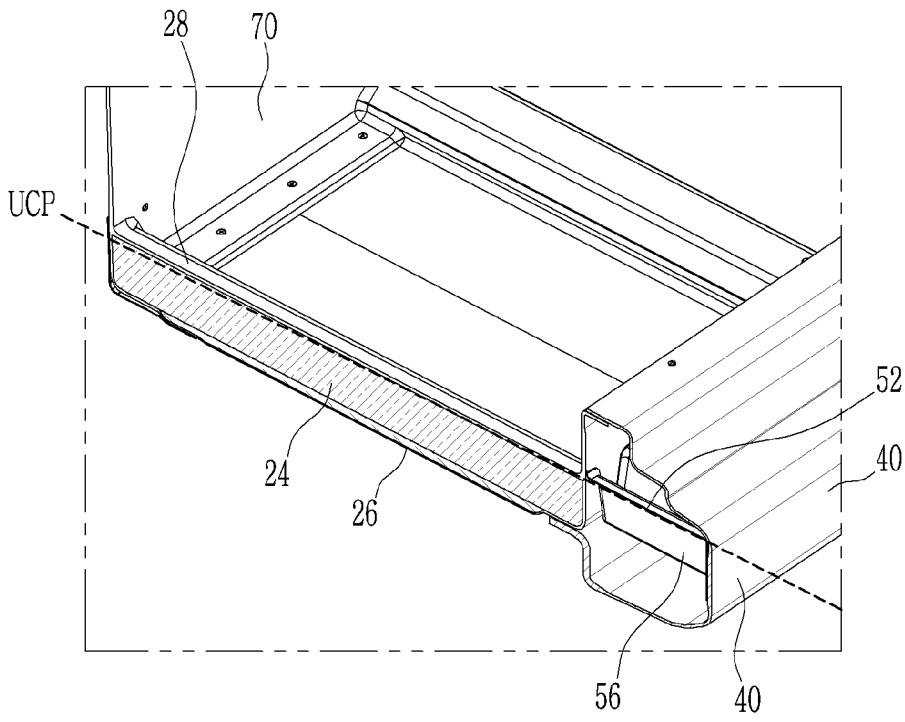
FIG. 7 is a cross-section perspective view along line VII-VII in FIG. 1.

FIG. 7 is a cross-section perspective view along line VII-VII in FIG. 1.

Referring to FIG. 7, the mount protruding portion 28 may form an upper crash load path UCP together with the upper reinforcement surface 52.

The mount protruding portion 28, for example, an upper surface of the mount protruding portion 28 may be disposed at an adjacent height along the width direction of the vehicle body 10 to form the upper crash load path UCP.

That is, when a side collision of the vehicle body 10 occurs, the impact load is distributed to the internal tunnel portion 70 through the upper crash load path UCP formed by the side sill outer 40, the upper reinforcement surface 52 of the side reinforcement 50, and the mount protruding portion 28 to reduce occupant injury and prevent damage to high power batteries during collision.

The cabin portion 20, which may be applied to the side reinforced vehicle body according to various exemplary embodiments of the present disclosure, is formed of a CFRP material, and the internal connection surface 60 and the side sill inner 30 may be bonded.

That is, the cabin portion 20 is formed of a high-strength and lightweight CFRP material, and may be connected to the side reinforcement 50 of the CFRP material by bonding.

The side sill outer 40, which may be applied to the side reinforced vehicle body according to various exemplary embodiments of the present disclosure, is formed of a CFRP material, and the external connection surface 62 and the side sill outer 40 may be bonded.

That is, the side sill outer 40 is formed of a high-strength and lightweight CFRP material, and may be connected to the side reinforcement 50 of the CFRP material by bonding.

Through this, the structure strength inside the side sill may be strengthened, the occupant may be protected in the event of a vehicle collision, and the battery may be prevented from being damaged.

Figure 8:
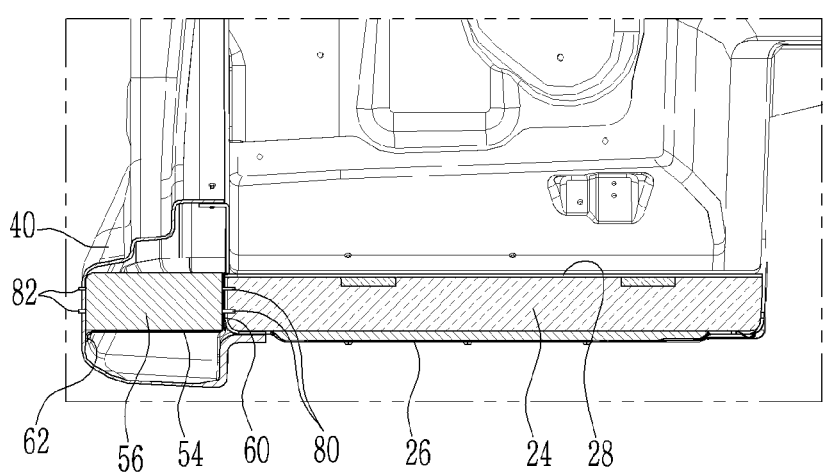
FIG. 8 is a cross-sectional view along line VI-VI in FIG. 1, viewed from the rear of the vehicle body.

FIG. 8 is a cross-sectional view along line VI-VI in FIG. 1, viewed from the rear of the vehicle body.

The cabin portion 20, which may be applied to the side reinforced vehicle body according to various exemplary embodiments of the present disclosure, may alternatively be formed of a metal material.

If the cabin portion 20 is formed of a metal material, the internal connection surface 60 and the side sill inner 30 may be bolted together through a bolt 80.

When the cabin portion 20 is made of a metal material and the side reinforcement 50 is made of a CFRP material, an internal corrosion may be prevented through bolting.

The side sill outer 40, which may be applied to the side reinforced vehicle body according to various exemplary embodiments of the present disclosure, may alternatively be formed of a metal material.

When the side sill outer 40 is formed of a metal material, the external connection surface 62 and the side sill outer 40 may be bolted together through a bolt 82.

When the side sill outer 40 is formed of a metal material and the side reinforcement 50 is a CFRP material as a heterogeneous material, internal corrodes may be prevented through bolting.

As described above, the side reinforced vehicle body according to various exemplary embodiments of the present disclosure may be reinforced using the side reinforcement including a zig-zag pattern.

The zig-zag pattern of the side reinforcement applied to the side reinforced vehicle body according to various exemplary embodiments of the present disclosure may include an effect similar to that in which a plurality of ribs are disposed with respect to the side impact load direction.

Because the structure of the side reinforcement applied to the side reinforced vehicle body according to various exemplary embodiments of the present disclosure is simple, the number of parts may be reduced and the weight of the vehicle body may be reduced.

A complex design such as a flange configuration for coupling the side reinforcement applied to the side reinforced vehicle body according to various exemplary embodiments of the present disclosure is unnecessary, and the assembly process may be simplified.

The cross member inner applied to the side reinforced vehicle body according to various exemplary embodiments of the present disclosure may absorb the impact load during a side-direction collision and distribute the impact load to the internal tunnel portion.

The side sill outer, the upper reinforcement surface of the side reinforcement, and the mount protruding portion applied to the side reinforced vehicle body according to various exemplary embodiments of the present disclosure form the upper crash load path to disperse the crash load.

The side sill outer, the lower reinforcement surface of the side reinforcement, and the under floor body applied to the side reinforced vehicle body according to various exemplary embodiments of the present disclosure form the lower crash load path to distribute the crash load.

In the side reinforced vehicle body according to various exemplary embodiments of the present disclosure, double collision loads are formed, so occupant protection against side loads and prevention of battery damage are possible.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A side reinforced vehicle body comprising:
   a side sill inner formed in a longitudinal direction of a cabin portion;
   a side sill outer surrounding the side sill inner; and
   a side reinforcement including a zig-zag pattern cross-section and disposed between the side sill inner and the side sill outer,
   wherein the side reinforcement is integrally formed with Carbon Fiber Reinforced Plastic (CFRP) material,
   wherein the side reinforcement includes:
      a plurality of upper reinforcement surfaces;
      a plurality of lower reinforcement surfaces; and
      a plurality of side reinforcement surfaces connecting the upper reinforcement surfaces and the lower reinforcement surfaces,
   wherein the side reinforcement further include an internal connection surface in contact with the side sill inner,
   wherein the side reinforcement further include an external connection surface in contact with the side sill outer.

2. The side reinforced vehicle body of claim 1, wherein the external connection surface connects first portions of the side reinforcement surfaces, the upper reinforcement surfaces, and the lower reinforcement surfaces to increase a strength of the side reinforcement.

3. The side reinforced vehicle body of claim 1, wherein the internal connection surface connects second portions of the side reinforcement surfaces, the upper reinforcement surfaces, and the lower reinforcement surfaces to increase a strength of the side reinforcement.

4. The side reinforced vehicle body of claim 1, wherein the cabin portion includes:
   a cabin under floor; and
   a cross member inner mounted to the cabin under floor along a width direction of the side reinforced vehicle body.

5. The side reinforced vehicle body of claim 4, wherein the cabin under floor includes:
   an under floor body; and
   a mount protruding portion on which the cross member inner is mounted.

6. The side reinforced vehicle body of claim 4, wherein the cross member inner is formed of a foam core material.

7. The side reinforced vehicle body of claim 5,
   wherein the under floor body and the lower reinforcement surfaces form a lower crash load path.

8. The side reinforced vehicle body of claim 7, wherein the under floor body and the lower reinforcement surfaces are disposed at a same level along the width direction of the vehicle body to form the lower crash load path.

9. The side reinforced vehicle body of claim 5,
   wherein the mount protruding portion and the upper reinforcement surfaces form an upper crash load path.

10. The side reinforced vehicle body of claim 1,
   wherein the cabin portion is formed of CFRP material, and
   wherein the internal connection surface and the side sill inner are bonded together.

11. The side reinforced vehicle body of claim 1, wherein the cabin portion is formed of a metal material, and
   wherein the internal connection surface and the side sill inner are bolted together.

12. The side reinforced vehicle body of claim 1, wherein the side sill outer is formed of CFRP material, and the external connection surface and the side sill outer are bonded together.

13. The side reinforced vehicle body of claim 1, wherein the side sill outer is formed of a metal material, and wherein the external connection surface and the side sill outer are bolted together.

14. The side reinforced vehicle body of claim 4, wherein the cabin portion includes an internal tunnel portion protruding to a center portion thereof, and wherein the cross member inner contacts with the internal tunnel portion.

15. The side reinforced vehicle body of claim 1, wherein the zig-zag pattern cross-section includes a trapezoidal shape and an inverted trapezoidal shape alternately formed each other.

* * * * *